US011607289B2

(12) United States Patent
Echevarria

(10) Patent No.: US 11,607,289 B2
(45) Date of Patent: Mar. 21, 2023

(54) SILENT HANDPIECE WITH LIGHTS

(71) Applicant: Santa Echevarria, Brockton, MA (US)

(72) Inventor: Santa Echevarria, Brockton, MA (US)

( * ) Notice: Subject to any disclaimer, the term of this patent is extended or adjusted under 35 U.S.C. 154(b) by 196 days.

(21) Appl. No.: 16/948,795

(22) Filed: Oct. 1, 2020

(65) Prior Publication Data

US 2021/0100636 A1 Apr. 8, 2021

Related U.S. Application Data

(60) Provisional application No. 62/909,559, filed on Oct. 2, 2019.

(51) Int. Cl.
*A61C 1/08* (2006.01)
*A61C 3/02* (2006.01)
*A61C 1/00* (2006.01)

(52) U.S. Cl.
CPC ............ *A61C 1/088* (2013.01); *A61C 1/0023* (2013.01); *A61C 3/02* (2013.01); *A61C 2203/00* (2013.01)

(58) Field of Classification Search
CPC ......... A61C 1/088; A61C 1/0023; A61C 3/02; A61C 2203/00
USPC .......................................................... 433/27
See application file for complete search history.

(56) References Cited

U.S. PATENT DOCUMENTS

| | | | | |
|---|---|---|---|---|
| 3,745,654 | A * | 7/1973 | Ellman | A61C 1/081 433/32 |
| 5,902,105 | A * | 5/1999 | Uejima | H02J 7/00036 433/77 |
| 2004/0106081 | A1* | 6/2004 | Karazivan | A61C 17/20 433/29 |
| 2007/0121786 | A1* | 5/2007 | Okawa | A61B 1/24 378/65 |
| 2007/0254261 | A1* | 11/2007 | Rosenblood | A61C 1/0023 433/98 |
| 2012/0301844 | A1* | 11/2012 | Guaragno | A61C 17/20 433/101 |
| 2013/0045456 | A1* | 2/2013 | Feine | G05B 15/02 433/215 |
| 2015/0374454 | A1* | 12/2015 | Beerstecher | A61C 17/08 433/215 |
| 2016/0058525 | A1* | 3/2016 | Nichols | A61C 1/088 433/29 |
| 2017/0119496 | A1* | 5/2017 | Griffin | A61C 1/0023 |
| 2018/0271617 | A1* | 9/2018 | Feldman | A61C 17/221 |
| 2021/0100636 | A1* | 4/2021 | Echevarria | A61C 3/02 |

* cited by examiner

*Primary Examiner* — Matthew M Nelson
(74) *Attorney, Agent, or Firm* — Dunlap Bennett & Ludwig, PLLC

(57) ABSTRACT

A noiseless handpiece providing indicator lights. The head portion of the handpiece has one or more internal silencers for baffling the noise that is a byproduct of the generation of the rotational force used to drive the drill component. The indicator lights communicate one or more operational states to the user and reflect the engagement of an electrically connected transducer.

9 Claims, 2 Drawing Sheets

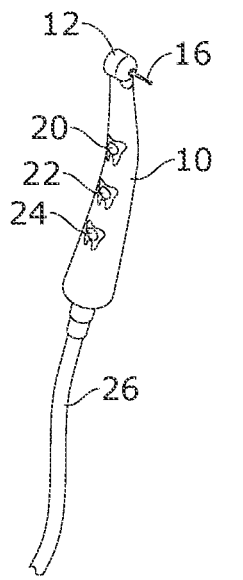
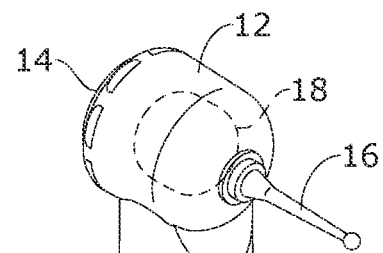
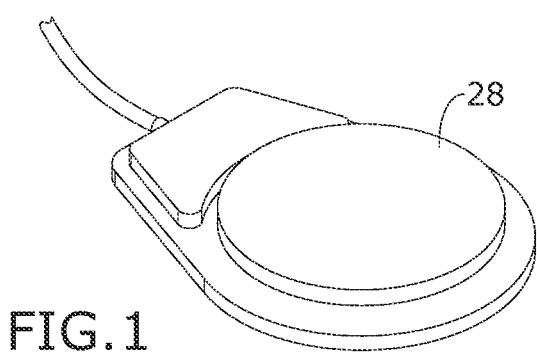
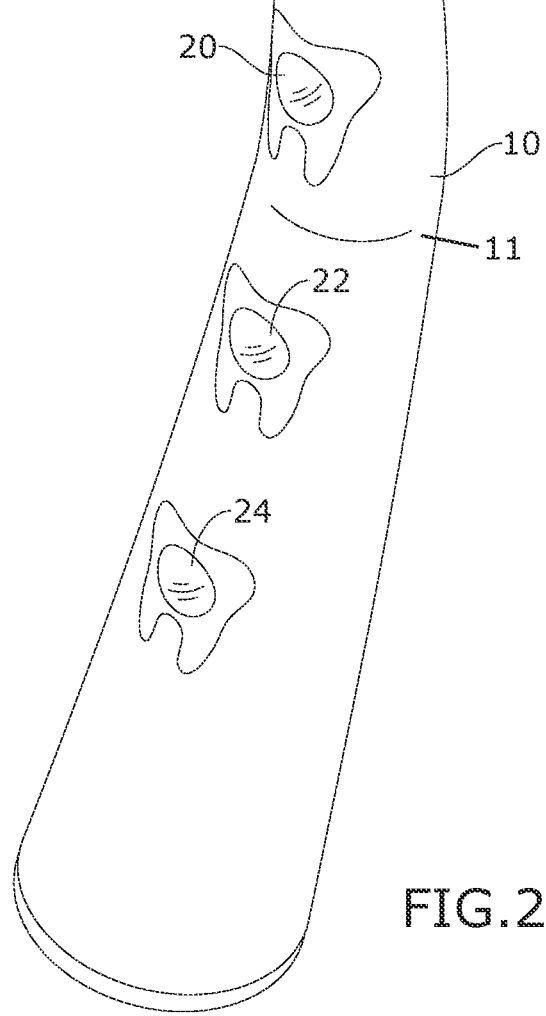
FIG.1
FIG.2

SILENT HANDPIECE WITH LIGHTS

CROSS-REFERENCE TO RELATED APPLICATION

This application claims the benefit of priority of U.S. provisional application No. 62/909,559, filed 02 OCT. 2019, the contents of which are herein incorporated by reference.

BACKGROUND OF THE INVENTION

The present invention relates to the dental arts and, more particularly, a silent handpiece with lights.

As the dental patient sits in the dental chair, nervous, apprehensive, possibly terrified, all they hear is the loud drilling noise in their ear. This is major complaint of patients, especially ones that feel overwhelmed and vulnerable.

Sometimes patients use headphones, but that does not even help, and in some situations only exasperates the patient's anxiety and sense of fear. Silence is what they want. Patients tend to cancel appointments and avoid dentistry all together because, at least in part, of the awful noises the drills make.

As can be seen, there is a need for a noiseless handpiece, which solves the above-mentioned problem with silencers. The silent handpiece is configured to block out noise and provide indicator light in lieu of noise. No more noise, total silence. No more complaints about how loud the dental drill is; with the noiseless handpiece in use patients' biggest concern may become falling asleep in the dental chair.

SUMMARY OF THE INVENTION

In one aspect of the present invention, a noiseless dental handpiece including the following: a handle with a proximal end and a distal end; the proximal end connected to a head portion; the distal end connected to an electrical connector; a transducer electrically connected to the electrical connector; and a plurality of light emitters along the handle, wherein each light emitter is electrically coupled to the transducer.

In another aspect of the present invention, the noiseless dental handpiece includes the following: a handle with a proximal end and a distal end; the proximal end connected to a head portion; the distal end connected to an electrical connector; a foot pedal transducer electrically connected to the electrical connector, wherein the foot pedal transducer regulates electrical power to the noiseless dental handpiece; and a plurality of light emitters along the handle, wherein each light emitter is electrically coupled to the foot pedal transducer, and wherein each light emitter indicates an operational state of the handpiece.

These and other features, aspects and advantages of the present invention will become better understood with reference to the following drawings, description and claims.

BRIEF DESCRIPTION OF THE DRAWINGS

FIG. 1 is a perspective view of an exemplary embodiment of the present invention, showing a connection to rheostat pedal 28;

FIG. 2 is a perspective view of an exemplary embodiment of the present invention, illustrating the bend 11 in the handle 10.

DETAILED DESCRIPTION OF THE INVENTION

Figure 3:
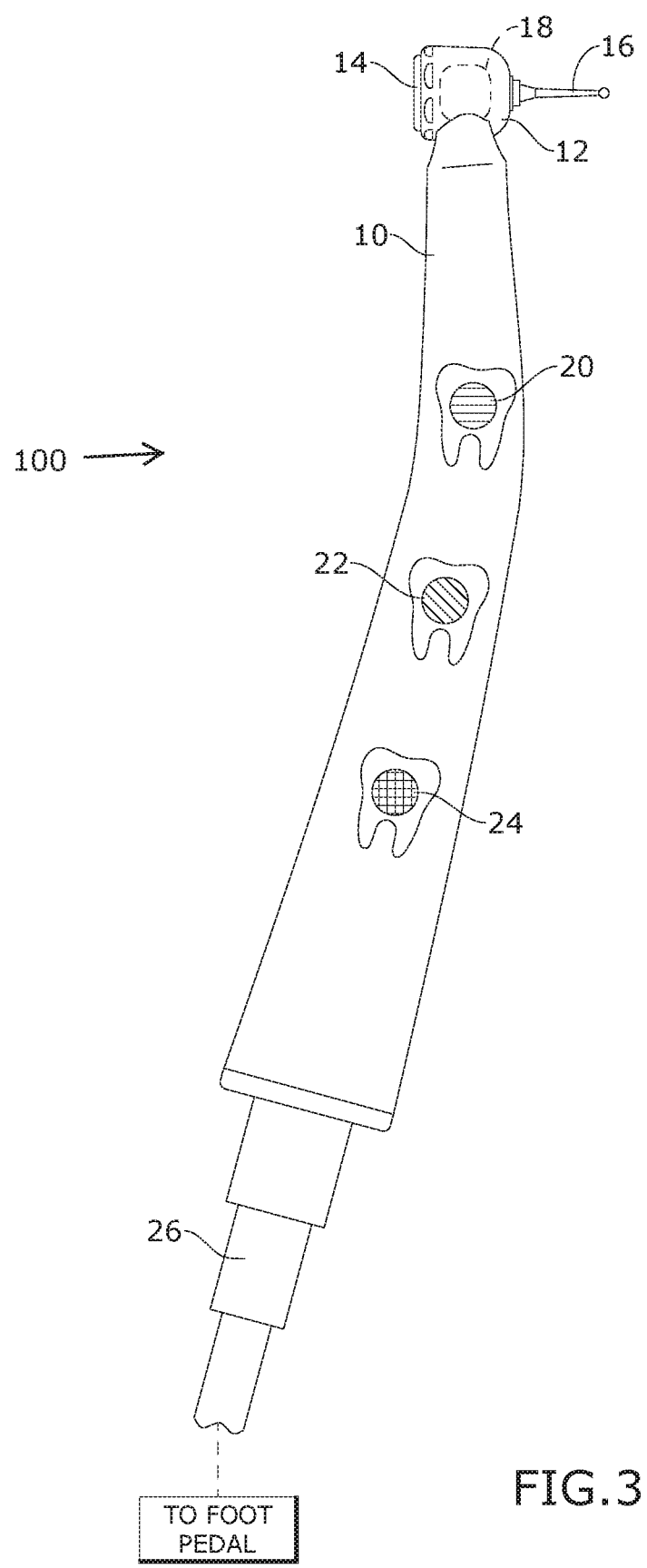
FIG. 3 is a front elevation view of an exemplary embodiment of the present invention, with light colors indicated by hatching for clarity.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a noiseless handpiece providing indicator lights. The head portion of the handpiece has one or more internal silencers for baffling the noise that is a byproduct of the generation of the rotational force used to drive the drill component. The indicator lights communicate one or more operational states to the user, reflecting the engagement of an electrically connected transducer.

Referring now to FIGS. 1 through 3, the present invention may include a noiseless handpiece 100 having a handle 10 with a proximal end and a distal end. The proximal end is connected to a head portion 12 and the distal end connected to an electrical connector 26. The electrical connector 26 may include a wire or be a wireless device that can received electrical inputs.

The handpiece (or dental drill) 100 has internal mechanical components which initiate a rotational force and provide power to the cutting instrument, the burr 16. Toque could range between 150 000 to 200,000 rpms. Along an opposed end of the burr 15, the head portion 12 may provide a release mechanism 14 for selectively remove and replace burrs 16. The head portion 12 has an internal silencer 18 that baffles the noise generated by said mechanical components.

A transducer 28 may be electrically connected to the electrical connector 26. The transducer 28 may be a configured to be a variable resistor (e.g., rheostat) which is used to control current (through varying the resistance in a circuit embodied in the handpiece 100) without interruption. The transducer 28 may be a foot pedal for the convenience of a dental practitioner.

Along the handle 12, a plurality of light emitters 22-26 may be provided. The figures show three: red (stop) 22, green (go) 24, and yellow (activated) 26, but it should be understood that there could be more or less light emitters. The plurality of light emitters 22-26 may be logically designed to light up as indicators when a user selectively engages the transducer 28, thereby communicating to the user that the handpiece 100 is operational, even though noiseless because of the silencer(s) 18. In certain embodiments, each light emitter is circumscribed by a tooth design that lights up with activation of the respective light emitter.

A method of using the present invention may include the following. The handpiece 100 disclosed above may be provided. The dental practitioner would electrically power the handpiece 100 and transducer 28 and utilize the burr 16 noiselessly.

Additionally, the present invention may be applied to other power drills, power cutters, or any power tool that is too loud for its work environment.

It should be understood, of course, that the foregoing relates to exemplary embodiments of the invention and that modifications may be made without departing from the spirit and scope of the invention as set forth in the following claims.

What is claimed is:

1. A dental handpiece comprising:
a handle with a proximal end and a distal end;
a bend in the handle between the proximal end and the distal end;
the proximal end connected to a head portion;
the distal end connected to an electrical connector;
a transducer electrically connected to the electrical connector; and
a plurality of light emitters along the handle, wherein each light emitter is electrically coupled to the transducer, wherein a first light emitter of the plurality of light emitter is located upward of the bend, wherein the first light emitter is configured to emit a first color for signaling the transducer being selectively engaged, and wherein a remainder of the plurality of light emitters are disposed downward of the bend.

2. The dental handpiece of claim 1, wherein the transducer is a foot pedal.

3. The dental handpiece of claim 1, wherein the transducer regulates electrical power to the noiseless dental handpiece.

4. The dental handpiece of claim 1, wherein each light emitter indicates an operational state of the handpiece.

5. The dental handpiece of claim 1, wherein each light emitter is circumscribed by a tooth design.

6. The dental handpiece of claim 1, wherein a second light emitter of the remainder of the plurality of light emitters is configured to emit a second color for signaling that the selected engagement of the transducer has stopped.

7. A dental handpiece comprising:
a handle with a proximal end and a distal end;
a bend in the handle between the proximal end and the distal end;
the proximal end connected to a head portion;
the distal end connected to an electrical connector;
a foot pedal transducer electrically connected to the electrical connector, wherein the foot pedal transducer regulates electrical power to the noiseless dental handpiece; and
a plurality of light emitters along the handle, wherein each light emitter is electrically coupled to the foot pedal transducer, and wherein each light emitter indicates an operational state of the handpiece, wherein each light emitter is electrically coupled to the transducer, wherein a first light emitter of the plurality of light emitter is located upward of the bend, wherein the first light emitter is configured to emit a first color for signaling the transducer being selectively engaged, and wherein a remainder of the plurality of light emitters are disposed downward of the bend.

8. The dental handpiece of claim 7, wherein each light emitter is circumscribed by a tooth design.

9. The dental handpiece of claim 6, wherein a third light emitter of the remainder of the plurality of light emitters is configured to emit a third color for signaling that the electrical connector is activated and thus electrically connected to the transducer.

* * * * *